United States Patent [19]

Wise et al.

[11] Patent Number: 4,642,644
[45] Date of Patent: Feb. 10, 1987

[54] NOISE JAMMER DISCRIMINATION BY NOISE MODULATION BANDWIDTH

[75] Inventors: Carl D. Wise, Severna Park; Frank W. Hays, Ellicott City; Thomas K. Lisle, Jr., Baltimore, all of Md.

[73] Assignee: The United States of America as represented by the Secretary of the Air Force, Washington, D.C.

[21] Appl. No.: 618,287

[22] Filed: Jun. 7, 1984

[51] Int. Cl.$^4$ ............................................... G01S 7/36
[52] U.S. Cl. ..................................................... 342/14
[58] Field of Search ............ 343/18 E, 5 SA, 17.1 PF

[56] References Cited

U.S. PATENT DOCUMENTS

| | | | |
|---|---|---|---|
| 2,897,442 | 7/1959 | Wright et al. | 324/77 |
| 3,215,934 | 11/1965 | Sallen | 324/77 |
| 3,321,759 | 5/1967 | Freedman | 343/17.2 |
| 3,919,707 | 11/1975 | Evans | 343/5 DP |
| 3,924,182 | 12/1975 | Jensen | 324/77 R |
| 4,170,009 | 10/1979 | Hamer | 343/18 E |
| 4,209,835 | 6/1980 | Guadagnolo | 364/715 |
| 4,217,580 | 8/1980 | Lowenschuss | 343/77 R |
| 4,241,889 | 12/1980 | Schwellinger et al. | 244/3.15 |
| 4,369,445 | 1/1983 | Evans et al. | 343/18 E |

Primary Examiner—Thomas H. Tarcza
Assistant Examiner—Donald E. Hayes, Jr.
Attorney, Agent, or Firm—Richard J. Donahue; Donald J. Singer

[57] ABSTRACT

A method for distinguishing between multiple noise jammer sources having different noise modulation bandwidths. Noise signals are detected by a receiver having a bandwidth substantially the same as the bandwidth of the jammer noise source. The dwell time of the noise pulses formed by the receiver provides a means for determining the noise modulation bandwidth of a noise jammer source.

3 Claims, 3 Drawing Figures

NOISE JAMMER DISCRIMINATION BY NOISE MODULATION BANDWIDTH

STATEMENT OF GOVERNMENT INTEREST

The invention described herein may be manufactured and used by or for the Government for governmental purposes without the payment of any royalty thereon.

BACKGROUND OF THE INVENTION

The present invention concerns a method for differentiating between multiple noise jammer sources. More particularly, the present invention concerns a method for differentiating between multiple noise jamming sources in instances where two or more radar platforms are used to triangulate on the jamming sources for the purpose of ascertaining their precise locations.

Noise jammer discriminant measurements are difficult to make for several reasons. First, the wide bandwidth of the noise jammer signal transmissions proves difficult for the narrow bandwidth receivers required to operate with narrow beamwidth antennas. Further, the noise-like nature of the jammer transmissions is difficult to characterize in a receiver. Finally, even wide band jammer transmissions contain very little information. Such transmissions are similar to a spread spectrum signal where the entire spectrum must be received and demodulated to acquire any information.

When two or more surveillance radar platforms attempt to triangulate on multiple aircraft carrying noise jammers, the intersections of the noise strobes produce ghost positions which cannot be distinquished from actual aircraft positions. The problem is eased somewhat by geometric considerations but in the presence of numerous jammers, accurate position information (sufficient to vector interceptor aircraft) cannot be acquired.

Jammer noise "fingerprints" are very difficult to make. Therefore, it is desireable to have several measurements which can be used to better accommodate a wider variety of situations. In a related patent application by Carl D. Wise and Frank W. Hays, filed concurrently herewith, entitled Noise Jammer Discrimination By Noise Spectral Bandwidth, and having Ser. No. 618,288, a method is disclosed for estimating the noise spectral bandwidths of different jammers by measuring their respective duty cycles in a narrow band receiver. The present application describes a method for measuring amplitude and pulse width statistics to characterize the modulation differences in jammer signals.

It is therefore an object of the present invention to specify a method according to which it is possible to differentiate between multiple noise jammer sources having the same noise spectral bandwidth.

It is a further object of the present invention to provide a method for distinguishing between noise jammer sources having different noise modulation bandwidths.

It is another object of the present invention to provide a method for aiding in the location of multiple aircraft carrying narrow band noise jammer sources.

SUMMARY OF THE INVENTION

The solution in accordance with this invention involves a method wherein the relative noise modulation bandwidth (NMBW) of the several noise jammer sources is determined and used to distinguish between jammers of similar noise spectral bandwidth. When used with other methods of discriminating noise strobes, it also relieves the aforementioned ghosting problem and improves the tracking of noise jammers.

The novel method involves the detection of noise signals emitted by a selected noise jammer source by means of a receiver having a bandwidth substantially the same as the bandwidth of narrow band, set-on noise jammer sources.

For a better understanding of the present invention together with other objects, features, and advantages of the invention not specifically mentioned, references should be made to the accompanying drawing and following description, while the scope of the invention will be pointed out in the appended claims.

BRIEF DESCRIPTION OF THE DRAWINGS

Referring to the drawings.

DESCRIPTION OF THE PREFERRED EMBODIMENT

In the context of jammer noise signals, noise modulation bandwidth (referred herein as NMBW) and noise modulation rate (df/dt) are directly related to each other. First the terms must be defined.

Noise modulation bandwidth (NMBW) refers to the frequency range or bandwidth of the modulation waveform. Although this waveform can have a wide range of frequency components, typically the highest frequency is used to characterize the total bandwidth. Noise modulation rate (df/dt) is referred to as the frequency change per unit time of df/dt of the modulated noise waveform.

The exact relationship between NMBW and df/dt is a complex function of the specific noise waveform. However, that these quantities are directly related can be seen in the simple waveform shown in FIG. 1. Noise modulation bandwidth (NMBW) is characterized by the highest frequency. One cycle of the modulating waveform occurs over an interval T so the following expression can be written:

$$NMBW = 1/T$$

The noise modulation rate (df/dt) of this waveform is the total frequency change or noise spectral bandwidth (NBW) over the period of the waveform (T). This can be expressed:

$$df/dt = NBW/T$$

Therefore the noise modulation rate is directly related to the noise modulation bandwidth as follows:

$$df/dt = NBW \times NMBW$$

The jammer discriminant method disclosed herein evolved from the recognition that the noise modulation bandwidth of a noise jammer is related to the dwell time or pulse width that is generated in a victim receiver given that the receiver and the noise spectral bandwidths are essentially the same.

This can be seen since the dwell time (DT) of the jammer signal in the receiver bandwidth (RBW) depends on the modulation rate (df/dt) as follows:

$$DT = RBW/(df/dt)$$

Replacing the rate for bandwidth leads to the following expression:

$$DT = (1/NMBW) \times (RBW/NBW)$$

This equation shows that noise modulation bandwidth is inversely related to the receiver pulse or dwell time. When the receiver and jammer bandwidths are essentially the same, then pulse or dwell times can be used to characterize noise modulation bandwidth by relationship above.

Figure 1:
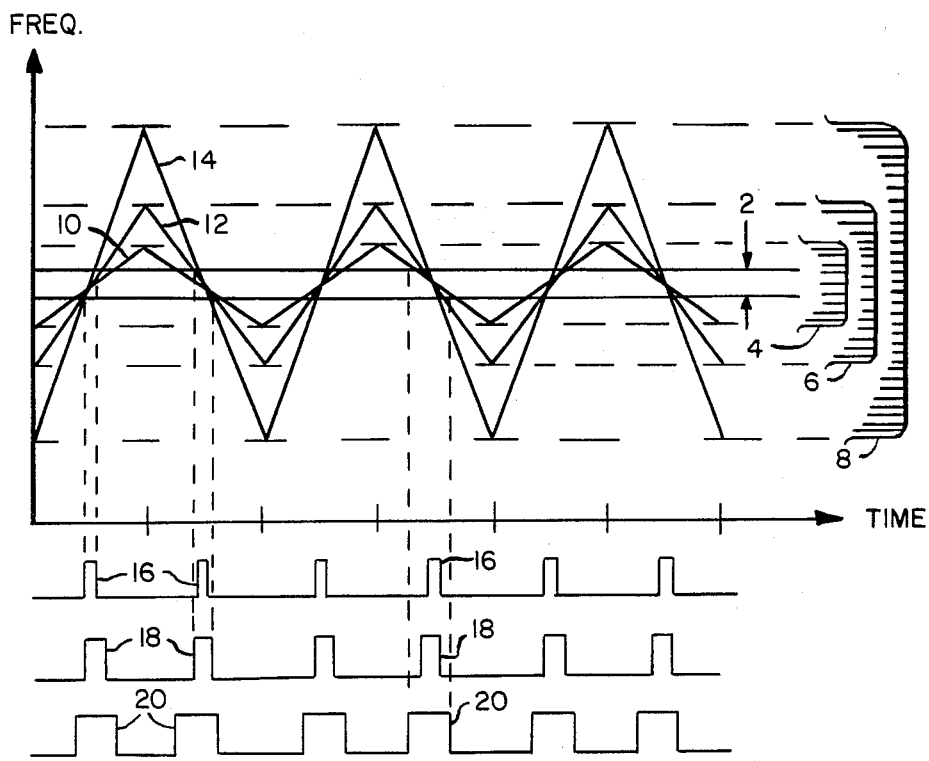
FIG. 1 is a graph which depicts the pulse output of a receiver responsive to noise jammer signals of different modulations rates.

Referring now to FIG. 1, for a fixed receiver bandwidth 2, three different noise jammer spectral bandwidths 4, 6 and 8 are shown. It will be assumed for the sake of clarity that the noise jammer modulations are triangular waveforms, such as the waveforms 10, 12 and 14. As the slope ($df/d_t$) of the noise modulation waveforms increase, as shown by the increasing slopes of the waveforms 10, 12 and 14 respectively, the corresponding dwell times of the signal within the receiver bandwidth decrease and the resultant width of the receiver pulses decrease. Thus, the modulation waveform 10 produces pulses 20, the modulation waveform 12 produces narrower pulses 18 and the modulation waveform 12 produces even narrower pulses 16. This has been found to be true for various noise spectral bandwidths 4, 6 and 8, provided that the receiver bandwidth 2 is substantially the same as, or slightly less than the noise spectral bandwidth of the jammer noise.

Figure 2:
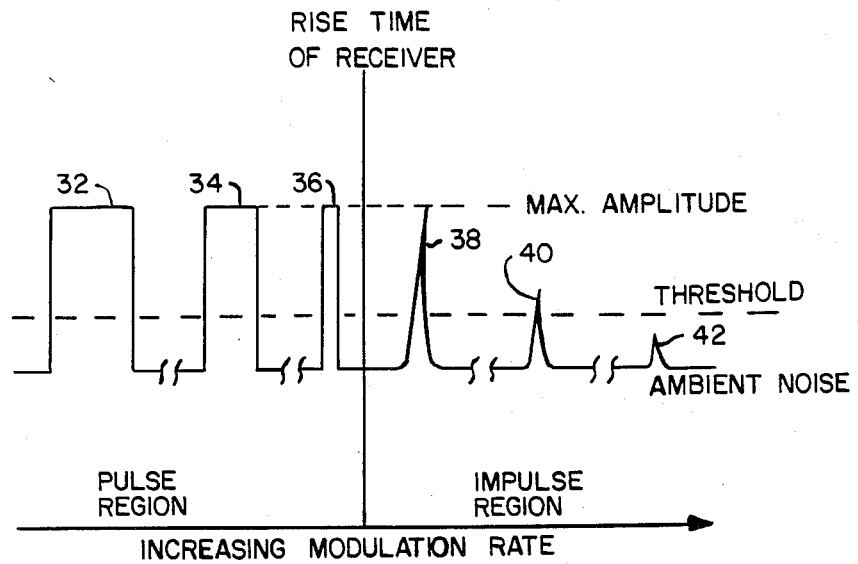
FIG. 2 is a graph which depicts the possible range of pulse output from a receiver responding to noise jammers of different modulation rates.

The response of a receiver adapted to receive jammer signals can be divided into two regions: the pulse region and the impulse region. FIG. 2 shows the relationship of these regions. When a signal falls in the pulse region, such as the signals 32, 34 and 36, the pulse width is determined by the modulation rate for any given noise bandwidth. The pulse amplitude is constant while the pulse width decreases as the modulation rate increases. The pulse width then narrows until the point is reached where the dwell time is equal to or less than the rise time of the receiver. At this cross-over point, the impulse region is entered. In the impulse region, amplitude and width decrease as the modulation rate increases. This is illustrated in FIG. 2 by impulses 38, 40, and 42. Finally, at some point the receiver no longer responds to the noise. A second factor governing impulse amplitude and width then is the detection threshold level. Experimental results have shown that the method described herein provides the best results when the modulation rates provide pulse responses in the receiver, as shown in the pulse portion of FIG. 2.

Figure 3:
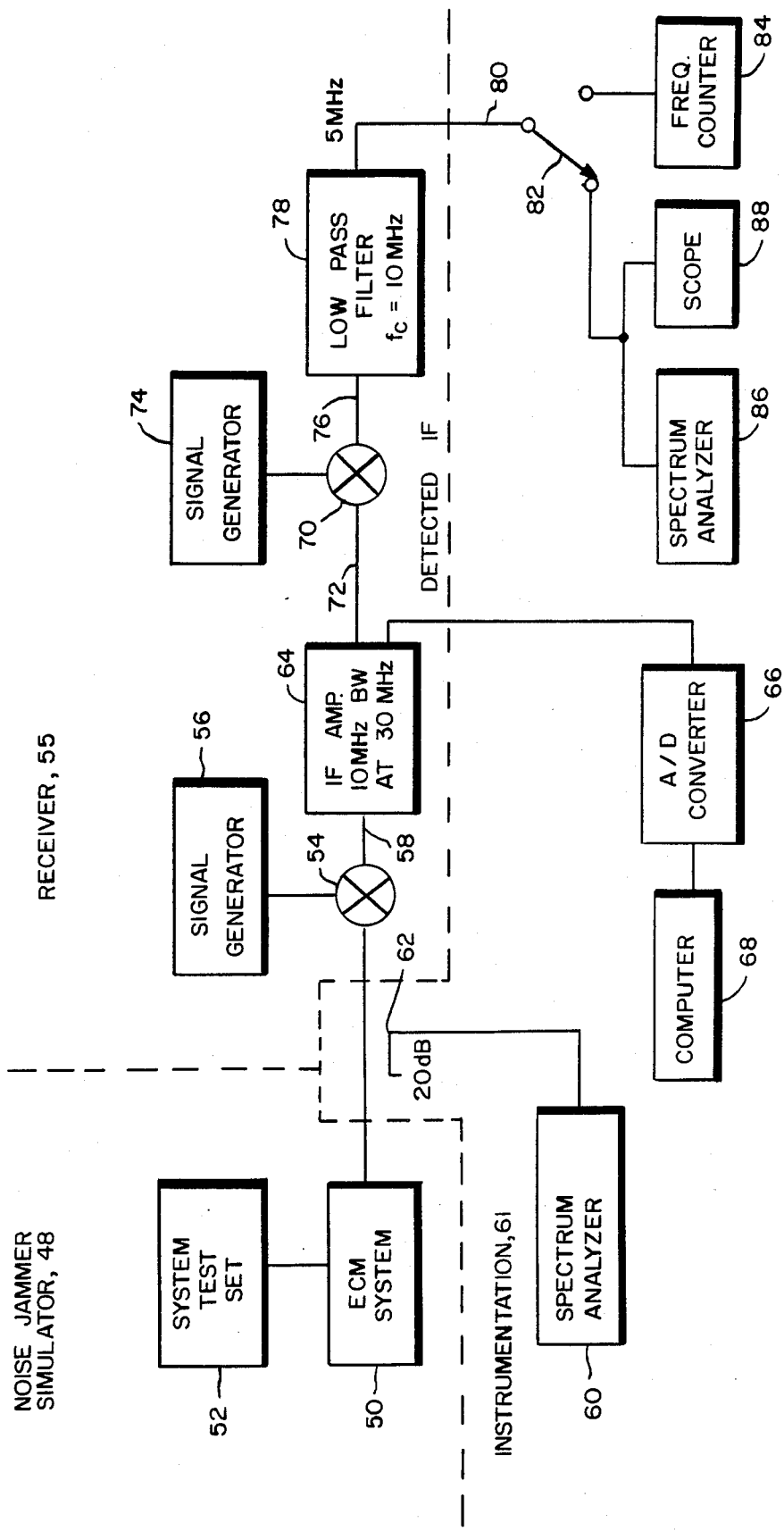
FIG. 3 is a block diagram representation of apparatus for simulating noise jammer signals of adjustable noise modulation rates, and for evaluating the method of the present invention.

FIG. 3 depicts, in block diagram form, apparatus for simulating noise jammer sources of different noise signal bandwidth, for receiving signals therefrom, and for determining the dwell times corresponding to various modulation rates and noise bandwidths.

In this apparatus, noise jammer signals are generated by a noise jammer simulator 48, consisting of an ECM (electronic countermeasure) system 50 under control of a system test set 52. Test set 52 determines the type of noise, noise bandwidth and noise modulation rates formed by the ECM system and applied to one input of a mixer 54 associated with the receiver 55 of FIG. 3. Mixer 54 also receives as an input, signals from signal generator 56 which down-converts the RF signal from ECM system 50 to an intermediate frequency on output lead 58. A spectrum analyzer 60 shown in the instrumentation section 61 which monitors the RF signal is coupled to the output of the ECM system 50 by means of a 20 dB coupler 62.

The intermediate frequency on output lead 58 is coupled to the input of an IF amplifier 64 having a 10 MHz bandwidth centered at 30 MHz. The output signal from IF amplifier 64 is recorded by an A/D converter 66 and a computer 68. The detected output signal from IF amplifier 64 is also coupled to a second mixer 70 via lead 72. Mixer 70 also receives an input signal from signal generator 74 to provide an output signal on lead 36, again down-converted in frequency. This output signal is applied to low pass filter 78, having a center frequency of 5 MHz and an upper frequency cutoff of 10 MHz. The output signal therefrom on lead 80 is applied to the arm of a single pole-double throw switch 82 where it is applied to either a frequency counter 84, or to an a spectrum analyzer 86, and oscilloscope 58. The dwell time or pulse width measurements using the apparatus of FIG. 3 were made by performing a statistical analysis of the signals detected at the output of IF amplifier 64 of the receiver using the A/D converter 66 and computer 68. When detections were made by the receiver, the computer 68 measured the length of the dwell time of the jammer signal.

Table A, below shows some calculated dwell times which correspond to maximum and minimum modulation rates and a range of noise bandwidths available with the test apparatus of FIG. 3. These calculations correpond to the data taken using the receiver 55.

Table A below, shows the calculated dwell times that could be expected in a 100 nanosecond rise time receiver for different noise spectral and modulation bandwidths.

TABLE A

| RBW = 10 MHz | I.F. Amplifier Risetime = 100 nsec. | |
|---|---|---|
| Noise BW (NBW) | Modulation BW (NMBW) | Dwell Time |
| 50 MHz | 20 MHz | 10.0 nsec |
|  | 5 MHz | 40.0 nsec |
|  | 3 MHz | 66.6 nsec |
|  | 1 MHz | 200.0 nsec |
|  | 300 MHz | 666.6 nsec |
| 25 MHz | 20 MHz | 20.0 nsec |
|  | 5 MHz | 80.0 nsec |
|  | 3 MHz | 133.3 nsec |
|  | 1 MHz | 400.0 nsec |
|  | 300 MHz | 1.3 usec |
| 10 MHz | 20 MHz | 50.0 nsec |
|  | 5 MHz | 200.0 nsec |
|  | 3 MHz | 333.3 nsec |
|  | 1 MHz | 1.0 usec |
|  | 300 KHz | 3.3 usec |
| 5 MHz | 20 MHz | 100.0 nsec |
|  | 5 MHz | 400.0 nsec |
|  | 3 MHz | 666.6 nsec |
|  | 1 MHz | 2.0 usec |
|  | 300 MHz | 6.6 usec |

Laboratory measurements have been made which support the calculations listed above. However, best results were obtained in instances where the receiver bandwidth was substantially the same as or slightly less than the noise spectral bandwidth.

As previously mentioned, the ability to distinquish between the noise modulation bandwidths of noise jammers enables surveillance radars to eliminate a significant amount of ghosting problems when triangulation is used to track targets.

Although the invention has been described with reference to a particular embodiment, it will be understood to those skilled in the art that the invention is capable of a variety of alternative embodiments within the spirit and scope of the appended claims.

What is claimed is:

1. A method of distinguishing between multiple noise jammer sources having different noise modulation bandwidths comprising the steps of:
   (a) detecting noise signals emitted by a selected noise jammer source by means of a receiver having a bandwidth substantially the same as the potential minimum spectral bandwidth of said noise signals;
   (b) forming noise pulses as said noise signals from said noise jammer source sweep through the bandwidth of said receiver;
   (c) determining the dwell time of said noise pulses; and
   (d) characterizing the noise modulation bandwidth from said dwell time and from the known bandwidth of said receiver to uniquely identify said selected noise jammer source.

2. A method of distinguishing between multiple noise jammer sources having different noise modulation bandwidths comprising the steps of:
   (a) detecting a noise signal emitted from a selected noise jammer source within a noise detection bandwidth substantially the same as the potential minimum spectral bandwidth of said noise jammer source;
   (b) forming noise pulses as said noise signals from said selected jammer source sweep through said noise detection bandwidth;
   (c) determining the dwell time of said noise pulses; and
   (d) characterizing the noise modulation bandwidth from said dwell time and from said noise detection bandwidth to uniquely identify said selected noise jammer source.

3. A method of distinguishing between noise jammer sources as defined in claim 2 wherein:
   said noise detection bandwidth is selected to be greater than one half of said potential minimum spectral bandwidth of said noise jammer source.

* * * * *

UNITED STATES PATENT AND TRADEMARK OFFICE
CERTIFICATE OF CORRECTION

PATENT NO. : 4,642,644

DATED : February 10, 1987

INVENTOR(S) : Carl D. Wise et al

It is certified that error appears in the above-identified patent and that said Letters Patent is hereby corrected as shown below:

In column 2, at line 40, the word "of" should read --or--.

Signed and Sealed this

Twenty-fifth Day of August, 1987

Attest:

DONALD J. QUIGG

Attesting Officer      Commissioner of Patents and Trademarks